(12) United States Patent
Kling Miller et al.

(10) Patent No.: US 9,139,459 B2
(45) Date of Patent: Sep. 22, 2015

(54) PROCESS AND SYSTEM FOR REMOVAL OF NAPHTHENIC ACID FROM AN AQUEOUS SOLUTION

(71) Applicant: LUSIA KLING MILLER, Trustee of the Miller Family Trust and Luisa Kling Miller Survivor's Trust, Houston, TX (US)

(72) Inventors: Luisa Kling Miller, Houston, TX (US); Jorge Miller, Houston, TX (US)

( * ) Notice: Subject to any disclaimer, the term of this patent is extended or adjusted under 35 U.S.C. 154(b) by 0 days.

(21) Appl. No.: 14/287,010

(22) Filed: May 24, 2014

(65) Prior Publication Data

US 2014/0346056 A1    Nov. 27, 2014

Related U.S. Application Data

(60) Provisional application No. 61/827,687, filed on May 27, 2013.

(51) Int. Cl.
*C02F 1/46* (2006.01)
*C02F 9/00* (2006.01)
(Continued)

(52) U.S. Cl.
CPC ... *C02F 9/00* (2013.01); *C02F 1/24* (2013.01); *C02F 1/463* (2013.01); *C02F 1/722* (2013.01); *C02F 1/76* (2013.01); *C02F 1/78* (2013.01);
(Continued)

(58) Field of Classification Search
CPC ............. C02F 9/00; C02F 1/76; C02F 1/78; C02F 1/463; C02F 1/722; C02F 1/24; C02F 1/32; C02F 2001/46133
USPC ............................... 205/742; 204/275.1, 277
See application file for complete search history.

(56) References Cited

U.S. PATENT DOCUMENTS 3,664,951 A    5/1972    Armstrong
3,915,822 A    10/1975    Veltman
(Continued)

FOREIGN PATENT DOCUMENTS

CN    102442748    5/2012
DE    25551751    8/1975
(Continued)

OTHER PUBLICATIONS

Int'l Search Report and Written Opinion, PCT/US14/39470, mailed Oct. 1, 2014, 14 pages.
(Continued)

*Primary Examiner* — Arun S Phasge
(74) *Attorney, Agent, or Firm* — The Juhasz Law Firm

(57) ABSTRACT

The present disclosure provides a process for removing naphthenic acid and/or naphthenic compounds from an aqueous solution. The process comprises one or more of the steps of: (a) feeding an aqueous solution comprising a constituent selected from the group consisting of naphthenic aldehyde, naphthenic alcohol, naphthenic acid, and combinations thereof, into a mix tank; (b) feeding an oxidizing agent into the mix tank forming a reactant mixture; (c) mixing the reactant mixture in the mix tank; (d) coagulating the reactant mixture with a polyvalent metallic electrode forming metallic naphthenate particles; (e) flocculating the metallic naphthenate particles forming floc; (f) sparging to float the floc to the surface of the aqueous solution; and (g) removing the floc from the aqueous solution. A system for removing naphthenic acid and/or naphthenic compounds from an aqueous solution is also disclosed herein.

13 Claims, 3 Drawing Sheets

(51) Int. Cl.
  *C02F 1/463*  (2006.01)
  *C02F 1/78*   (2006.01)
  *C02F 1/72*   (2006.01)
  *C02F 1/76*   (2006.01)
  *C02F 1/24*   (2006.01)
  *C02F 101/32* (2006.01)
  *C02F 1/461*  (2006.01)
  *C02F 101/34* (2006.01)

(52) U.S. Cl.
  CPC ... *C02F 2001/46133* (2013.01); *C02F 2101/32* (2013.01); *C02F 2101/34* (2013.01)

(56) References Cited

U.S. PATENT DOCUMENTS

| | | |
|---|---|---|
| 3,963,592 A | 6/1976 | Lindstrom |
| 4,048,030 A | 9/1977 | Miller |
| 4,119,518 A | 10/1978 | Miller |
| 4,121,991 A | 10/1978 | Miller et al. |
| 4,169,035 A | 9/1979 | Stummer et al. |
| 4,172,774 A | 10/1979 | Moeglich |
| 4,676,882 A | 6/1987 | Okazaki |
| 4,802,991 A | 2/1989 | Miller |
| 4,983,265 A | 1/1991 | Maruyama |
| 5,427,667 A | 6/1995 | Bakhir et al. |
| 5,628,888 A | 5/1997 | Bakhir et al. |
| 5,935,448 A | 8/1999 | Miller |
| 5,958,213 A | 9/1999 | Goto |
| 6,177,016 B1 | 1/2001 | Miller |
| 6,613,217 B1 | 9/2003 | Gilmore |
| 7,008,523 B2 | 3/2006 | Harrington |
| 2006/0243604 A1 | 11/2006 | Nakagawa et al. |
| 2007/0227904 A1* | 10/2007 | Miller et al. ............... 205/742 |
| 2010/0126910 A1 | 5/2010 | Moffett et al. |
| 2011/0192730 A1 | 8/2011 | Bjornen |

FOREIGN PATENT DOCUMENTS

| | | |
|---|---|---|
| EP | 0141981 A1 | 5/1985 |
| EP | 1538128 | 6/2005 |
| WO | 93/13021 A1 | 7/1993 |
| WO | 99/41204 A1 | 8/1999 |
| WO | WO 2012038439 | 3/2012 |

OTHER PUBLICATIONS

Int'l Search Report, PCT/US07/65651, mailed Apr. 8, 2008, 7 pages.
IPER, PCT/US11/48315, mailed Sep. 22, 2011, 7 pages.

* cited by examiner

US 9,139,459 B2

PROCESS AND SYSTEM FOR REMOVAL OF NAPHTHENIC ACID FROM AN AQUEOUS SOLUTION

CROSS-REFERENCE TO RELATED APPLICATIONS

This application claims benefit of U.S. provisional patent application Ser. No. 61/827,687, filed May 27, 2013, which is hereby incorporated by reference in its entirety.

TECHNICAL FIELD

The present disclosure relates to processes and systems for removal of naphthenic aldehyde, naphthenic alcohol, naphthenic acid and combinations thereof from aqueous solutions.

BACKGROUND

Aqueous solutions generated in mining, oil, gas, and other industries or operations involving boring a hole in the earth may comprise naphthenic acid which may need be removed. For example, water produced with oil from underground formations may comprise contaminants such as naphthenic acid. A source of an aqueous solution comprising naphthenic acid may be from most any borehole drilled in the earth's crust. Another source may be from contacting any type of water with petroleum, gas, coal (e.g., mining), etc. may lead to the formation of naphthenic acid.

Naphthenic acids are the major contaminant in water used for extraction of oil from tar sands. In the oil industry, after a hole is drilled, on-shore or offshore, oil and water come out of the borehole. The water may contain contaminants such as alcohol, aldehydes, and naphthenic acid. The alcohols and aldehydes may be bound to the naphthenic molecules forming naphthenic alcohols and naphthenic aldehydes. Therefore, an aqueous solution containing naphthenic aldehydes, naphthenic alcohols, and naphthenic acids may come from the borehole. The naphthenic acids contaminating aqueous solution may present environmental concerns with respect to discharging of the aqueous solution. Additionally, naphthenic aldehydes and naphthenic alcohols may be poisonous. Therefore, naphthenic aldehydes, naphthenic alcohols, and naphthenic acids need to be removed from the aqueous solution prior to discharge into the environment.

The naphthenic acids may have a solubility in the aqueous solution preventing removal by traditional oil-water separation methods. In the past, industry has transported the contaminated aqueous solution into manmade lakes or holding ponds. Over long periods of time, oxygen from the air may oxidize the naphthenic aldehyde and naphthenic alcohol into naphthenic acid and then the oxygen may oxidize the naphthenic acids into more environmentally friendly compounds.

However, this traditional approach in removing naphthenic aldehyde, naphthenic alcohol, and/or naphthenic acid may not be practical in many situations. For example, in offshore oil drilling it may not be practical to have a holding tank to provide the residence time for oxidation with oxygen in air as traditionally done. Other inadequacies of traditional methods may include increased stringency of governmental regulations on discharging and increasing water volume in the oil being produced.

Therefore, a need exists for improved processes and systems for removing naphthenic alcohol, naphthenic aldehyde, and naphthenic acid and other naphthenic compounds from an aqueous solution.

SUMMARY OF THE INVENTION

In at least one aspect of the present disclosure, a process for removing a constituent selected from the group consisting of naphthenic aldehyde, naphthenic alcohol, naphthenic acid, and combinations thereof, from an aqueous solution is provided. The process comprises the steps of: (a) feeding an aqueous solution comprising a constituent selected from the group consisting of naphthenic aldehyde, naphthenic alcohol, naphthenic acid, and combinations thereof, into a mix tank; (b) feeding an oxidizing agent into the mix tank forming a reactant mixture; (c) mixing the reactant mixture in the mix tank; (d) coagulating the reactant mixture with a polyvalent metallic electrode forming metallic naphthenate particles; (e) flocculating the metallic naphthenate particles forming floc; (f) sparging to float the floc to the surface of the aqueous solution; and (g) removing the floc from the aqueous solution.

In at least one other aspect of the present disclosure, a process for removing naphthenic acid from an aqueous solution is provided. The process comprises the steps of: (a) feeding an aqueous solution comprising naphthenic acid into a reactor; (b) coagulating the naphthenic acid with a polyvalent metallic electrode forming metallic naphthenate particles; (c) flocculating the metallic naphthenate particles forming floc; (d) sparging the floc and floating the floc to the surface of the aqueous solution; and (e) removing the floc from the aqueous solution.

In at least one additional aspect of the present disclosure, an apparatus configured to remove a constituent selected from the group consisting of naphthenic aldehyde, naphthenic alcohol, naphthenic acid, and combinations thereof, from an aqueous solution is provided. The apparatus comprises: an aqueous solution feed conduit configured and disposed to continuously feed the aqueous solution comprising the constituent; an oxidizer feed unit configured and disposed to continuously feed one or more oxidizers; a mix tank configured and disposed to receive and mix the fed one or more oxidizers and the fed the aqueous solution comprising the constituent; an electrolytic cell having a top end and a bottom end and comprising a plurality of the polyvalent metallic electrodes connected in series; an inlet conduit connected to the bottom end of the electrolytic cell configured and disposed to receive the outflow from the mix tank; a closed upper section at the top end of the electrolytic cell, the upper section having an upper end and an outlet passage located at the upper end, and a sparger located above the electrodes and below the outlet passage, and a recirculating conduit located below the outlet passage; a closed draining space in fluid communication with the outlet passage further comprising means for separating water and impurities; and a recirculating pump connecting the recirculating conduit to the inlet conduit.

DETAILED DESCRIPTION

The following detailed description includes currently contemplated modes of carrying out the invention. The description is not to be taken in a limiting sense, but is made merely for the purpose of illustrating the general principles of the invention, since the scope of the invention is best defined by the appended claims. Various terms are used in the present disclosure, some may be defined elsewhere in this disclosure and some may not. If a term is defined elsewhere, then the broader definition shall be considered. Various inventive features are described below that may be used independently of one another or in combination with other features. Additionally, specific reference may be made by way of example to a selected constituent, however it is to be understood such reference is not limiting and that one or more of other constituents may be also be included with the reference.

Disclosed herein is a process and system for treating water contaminated with constituents such as naphthenic acid and naphthenic compounds such as, naphthenic aldehyde and naphthenic alcohol.

Naphthenic acids are carboxylic acids (usually monobasic) of the alicyclic series, containing one or more five-member (less frequently, six-member) hydrocarbon rings. Naphthenic acid is the name for an unspecific mixture of several cyclopentyl and cyclohexyl carboxylic acids with molecular weight of 120 to well over 700 atomic mass units. The main fraction are carboxylic acids with a carbon backbone of 9 to 20 carbons. For example, naphthenic acid may have the following molecular structure:

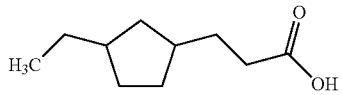

Naphthenic acids are the main oxygen-containing components of petroleum. Consequently, naphthenic acids present a major source of contamination in the petroleum industry. For example, naphthenic acids are the major contaminant in water used for extraction of oil from tar sands. Naphthenic acids may bind with alcohols and aldehydes in the petroleum to form naphthenic alcohols and naphthenic aldehydes. For example, cyclopropanol, cyclobutanol, cyclohexanol, and cycloheptanol may also be contaminants in aqueous solutions to be discharged by the petroleum industry. Naphthenic acids have both acute and chronic toxicity to fish and other organisms. The naphthenic aldehyde and naphthenic alcohols are highly poisonous. One advantage of the present disclosure may be the removal of naphthenic acid, naphthenic aldehyde, and naphthenic alcohol from an aqueous solution.

Naphthenates are the salts of naphthenic acids. Metal naphthenates are coordination complexes. Example naphthenates include those of aluminum, bismuth, calcium, cerium, copper, barium, cobalt, copper, iron, lead, lithium, magnesium, manganese, nickel, potassium, sodium, vandyl, zinc, and zirconium.

For example, aluminum naphthenate is represented by the chemical structure:

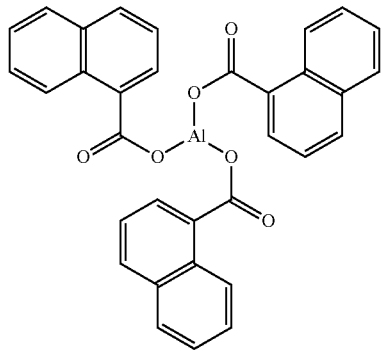

Figure 1:
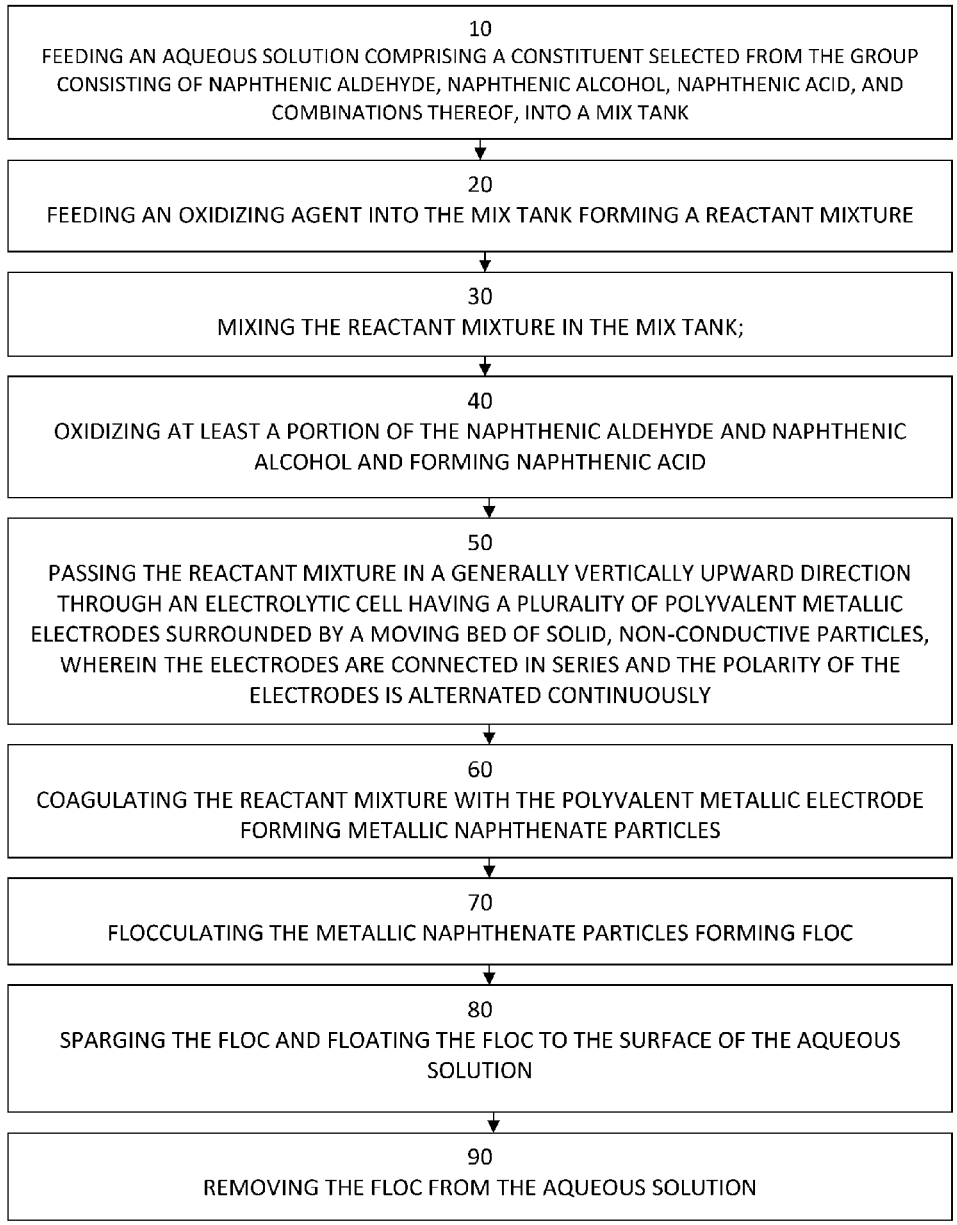
FIG. 1 is a flow chart illustrating a process of removing naphthenic acid and naphthenic compounds from an aqueous solution according to an aspect of the present disclosure.

FIG. 1 shows a process for removing naphthenic acid and naphthenic compounds from an aqueous solution according to an aspect of the present disclosure. By coordinating the naphthenic acid with metal and forming metal naphthenate, the naphthenic acid may be removed from an aqueous solution by the method disclosed herein. It is to be understood that the process shown in FIG. 1 may also apply to one or more of naphthenic aldehyde and naphthenic alcohol and is not intended to limit the present disclosure to any particular constituent to be removed from the aqueous solution.

Step 10 is the feeding of an aqueous solution comprising a constituent selected from the group consisting of naphthenic aldehyde, naphthenic alcohol, naphthenic acid, and combinations thereof, into a mix tank. For example, the aqueous solution may be waste water from the mining or oil industry. In step 20, an oxidizing agent is fed into the mix tank wherein it is mixed therewith in step 30, forming a reactant mixture. The oxidizer may accelerate the formation of metal naphthenate from the naphthenic acid. For example, in step 40, portions of naphthenic aldehyde and naphthenic alcohol, that may exist in the reactant mixture, may be oxidized to form naphthenic acid. Oxidation of the naphthenic aldehyde and naphthenic alcohol may be accomplished with the oxidizing agent by way of the naphthenic alcohols and/or naphthenic aldehydes to yield naphthenic acid. This oxidation of the naphthenic aldehyde and naphthenic alcohol may increase the concentration of the naphthenic acid which may in turn accelerate the formation of the naphthenate in Step 50. The oxidizer fed into the tank in step 20 may comprise most any oxidizer as is known by persons skilled in the art, for example, the oxidizer may comprise at least one peroxide, halogen, permanganate, or ozone.

Step 50 involves passing the reactant mixture in a generally vertically upward direction through an electrolytic cell having a plurality of polyvalent metallic electrodes surrounded by a moving bed of solid, non-conductive particles, wherein the electrodes are connected in series and the polarity of the electrodes is alternated continuously. Thus, an increase in the concentration of naphthenic acid in the aqueous solution in step 40 may increase the contacting of the naphthenic acid with the electrode and accelerate the formation of the naphthenate in step 60.

Step 60 comprises coagulating the reactant mixture with a polyvalent metallic electrode forming metallic naphthenate particles. The naphthenic acid in the aqueous solution may consume one or more metals from the polyvalent metallic electrode forming the metallic naphthenate particles or colloidal particles. Coagulation is the process by which colloidal particles and very fine solid suspensions are destabilized so that they can begin to agglomerate. Finely dispersed solids (colloids) suspended in wastewaters may be stabilized by negative electric charges on their surfaces, causing them to repel each other. Since this prevents these charged particles from colliding to form larger masses, called flocs, they may not settle. To assist in the removal of colloidal particles from suspension, chemical coagulation and flocculation are typically required. However, aspects of the present disclosure may not require the addition of coagulating chemicals.

The polyvalent metallic electrode may comprise at least one divalent or trivalent metal. For example, the polyvalent metallic electrode may comprise at least one of aluminum, bismuth, calcium, cerium, copper, barium, cobalt, copper, iron, lead, lithium, magnesium, manganese, nickel, potassium, sodium, vandyl, zinc, and zirconium. The naphthenic acid in the aqueous solution may form coordination complexes, such as metallic naphthenate particles or colloidal particles, with one or more metals from the polyvalent metallic electrode. Therefore, the passing of the reactant mixture through an electrolytic cell having a plurality of polyvalent metallic electrodes with their polarity continuously alternated, in step 50, may cause the formation of the naphthenate and induce the coagulation in step 60. The coagulation in step 60 may comprise destabilizing the metal naphthenate colloids by neutralizing the forces keeping them apart. Upon coagulation, the particles may collide to form larger particles (flocs) in step 70.

Step 70 comprises flocculating the metallic naphthenate particles forming floc. Flocculation is the action of forming bridges between the flocs and binding the particles into large agglomerates or clumps. Upon flocculation, the naphthenic acid may be removed from the aqueous solution by first sparging the floc and floating the floc to the surface of the aqueous solution in step 80, followed by removing the floc from the aqueous solution in step 90.

Sparging of the floc in step 80 may push or float the floc to the surface. For example, sparging may comprise introducing a fine dispersion of air bubbles into the aqueous solution carrying the floc to the surface where it may be skimmed off, or otherwise removed from the surface in step 90. For example, sparging may comprise the introduction of gases into a stirred or unstirred reactor vessel via millions of tiny bubbles which may increase the gas-to-liquid contact areas allowing for optimal contact of gases with the floc. In-tank applications, with sparging elements located inside the tank, may be batch or continuous flow, with or without agitation.

It is to be understood that one or more steps 10-90 may be carried out continuously and simultaneously. For example, steps 10-90 may be carried out in a continuous tank reactor where an aqueous solution comprising a constituent selected from the group consisting of naphthenic aldehyde, naphthenic alcohol, naphthenic acid, and combinations thereof, is continuously fed into a mix tank. The floc may continuously be removed from the tank and the aqueous solution having at least a portion of the naphthenic acid removed therefrom may be continuously discharged from the tank.

In an example of the presently disclosed process, hydrogen peroxide is mixed with an aqueous solution comprising naphthenic aldehyde, naphthenic alcohol, and naphthenic acid. The hydrogen peroxide is added to the aqueous solution at a concentration of about 2% to 4%, by stoichiometric weight or volume, forming a reactant mixture and allowed to react for about 8 to 20 minutes, to oxidize the naphthenic aldehyde and naphthenic alcohol, forming naphthenic acid. The reactant mixture is passed through an electrolytic cell having a plurality of aluminum electrodes with their polarity continuously alternated. The naphthenic acid consumes the aluminum electrode and forms aluminum naphthenate colloidal particles. The aluminum naphthenate colloidal particles then flocculate.

Figure 2:
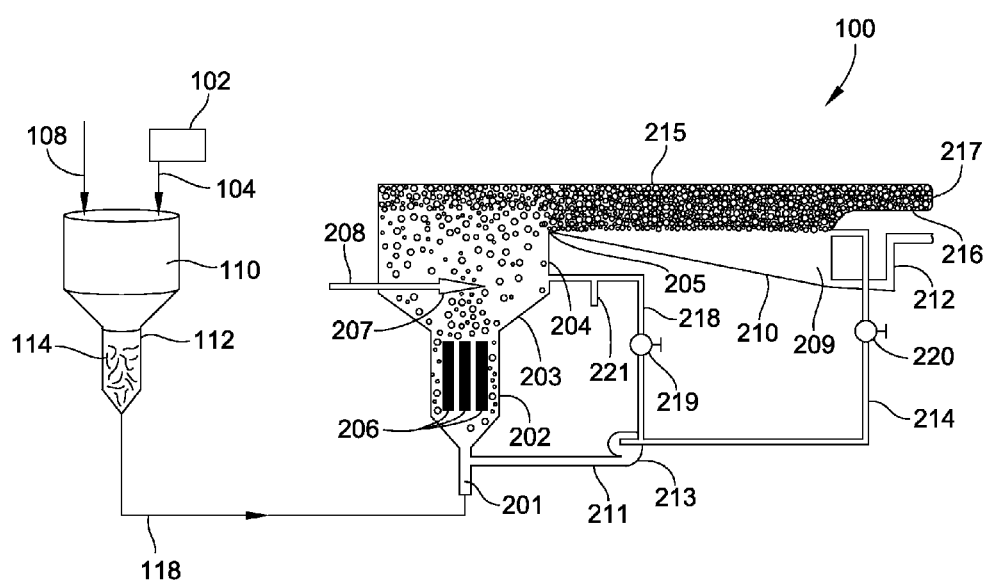
FIG. 2 shows a system for removing naphthenic acid and naphthenic compounds from an aqueous solution according to an aspect of the present disclosure.

FIG. 2 shows a system for removing naphthenic acid and naphthenic compounds from an aqueous solution according to an aspect of the present disclosure. Water purification system 100 may comprise a purification system such as the water purification system disclosed in U.S. patent application Ser. No. 12/859,041, by Miller et al, filed Aug. 18, 2010, incorporated herein by reference.

An oxidizer feed unit 102 may be configured and disposed to continuously feed one or more oxidizers to a mix tank 110 through a oxidizer feed conduit 104. The oxidizer(s) being fed with oxidizer feed unit 102 may be in solid or liquid form. For example, in at least one aspect of the present disclosure the oxidizer(s) are in solution and oxidizer feed unit 102 may be a docifier. In this aspect, the docifier may be configured to feed catalyst(s) drop-wise at a desired feed rate. However, it is to be understood that oxidizer feed unit 102 may comprise any feed unit as is known in the art to feed liquids or solids. For example, in at least one aspect of the present disclosure, oxidizer feed unit or device 102 may be configured and disposed to feed at least one oxidizer alone or a mixture of oxidizers into mix tank 110, through oxidizer feed conduit 104.

The term constituent as used herein, means the constituent to be removed from the aqueous solution and may include one or more of naphthenic acid, naphthenic aldehyde, and naphthenic alcohol. Aqueous constituent feed conduit 108 may be configured and disposed to continuously feed an aqueous solution comprising the constituent to mix tank 110. Aqueous constituent feed conduit 108 may be configured to receive most any aqueous solution comprising the constituent to be removed from most any source and fed to mix tank 110, at a desired flow rate. For example, aqueous constituent feed conduit 108 may be configured to receive water contaminated with naphthenic acid.

Mix tank 110 may be configured and disposed to receive one or more oxidizing agents from feed conduit 104 and the aqueous solution comprising the constituent to be removed from feed conduit 108. Mix tank 110 may be configured and disposed to mix the fed materials and deliver the mixed solution to mix tank outlet conduit 112. Mix tank 110 may comprise a mixer, not shown, such as a paddle mixer or other mixer as is known in the art. Mix tank 110 may have most any configuration and volume for providing a desired mixing of the feed materials. For example, mix tank 110 may have a lower conical portion configured to feed the mixed solution to mix tank outlet conduit 112. Mix tank outlet conduit 112 may be configured and disposed to receive the mixed solution from mix tank 110 and feed the mixed solution to inlet conduit 201. Mix tank outlet conduit 112 may also be configured to further mix the mixed solution and/or increase contact between the oxidizer(s) and the constituent(s) to be removed from the aqueous solution. For example, mix tank outlet conduit 112 may have a packing material 114 disposed therein. Packing material 114 may comprise Berl saddles, Raschig rings, Pall rings, metal Michael Bialecki rings, ceramic Intalox saddles, and/or other packing materials as are known in the art.

The reactant mixture may be fed through conduit 118 to inlet conduit 201 of the water purification system 100. Inlet conduit 201 may be connected to the bottom of an electrolytic cell 202. At the top of the electrolytic cell 202 is an upper section 204 having an outlet passage 205. The upper section 204 preferably includes a conical section 203 connected to the top of the electrolytic cell 202 and an outlet conduit 218. The outlet passage 205 is located above the conical section 203. Between the outlet passage 205 and the conical section 203, the outlet conduit 218 exits the upper section.

Outlet conduit 218 includes line 221 and is fed to the inlet of a recirculating pump 213. Air and additional soap may be introduced through line 221 into the system. The upper section 204 is preferably closed to the atmosphere. Electrodes 206 are mounted in cell 202 in any suitable way (not shown in the drawing) and are connected in series to a direct current source which is changed in polarity continuously. In some embodiments of the invention, an air sparger 207 may be located at the top of the conical section 203, above the point where the solid particles have settled, but still below the surface level of fluid. By "sparger" herein what is meant that an air blower is positioned below fluid level, so as to blow bubbles through the fluid. The air sparger 207 supplies additional bubbles besides those formed during electrolysis to the upper section 204. The air sparger 207 may be connected to a compressed air supply 208. The compressed air produces bubbles to float the flocs produced by the release of metallic soaps during the electrolysis of the water to be purified. In some embodiments, the air bubbles are introduced after the electrolytic cell, but below the surface level of the fluid (e.g., below the outlet passage 205).

Outlet passage 205 is connected to basin 209. Basin 209 also includes a draining space 215 that may have an inclined bottom 210. A recirculating conduit 211 is near the upper edge of the basin and preferably opposite from the outlet passage 205. The basin 209 is preferably closed to the atmosphere. A purified water outlet 212 is at the bottom of basin 209, also preferably opposite from the outlet passage 205. A suds outlet 216 is located opposite the outlet passage 205, preferably some distance away to allow acceptable separation of the floc and the purified water. Recirculating conduit 211, along with outlet conduit 218, is fed to recirculating pump 213 whose outlet 214 may be connected to the inlet conduit 201 below the electrolytic cell 202.

Basin 209 also includes a suds outlet 216 which is located above the draining space 215. The location of the recirculating conduit 211 is preferably located near or below the layer of bubbles in order to catch any settling floc and recycling it to the electrolytic cell. This insures that all floc preferably exits through the suds outlet 216. Water containing flocs and bubbles is led through passage 205 to basin 209 and the draining space 215. Purified water leaves via purified water outlet 212 which is preferably at a level below that of the suds layer during operation. Recirculating conduit 211 and conduit 218 leads recirculating water with flocs through pump 213 and conduit 214 to intake conduit 211. Conduit 218 recirculates the upper layer of water in the conical section of the electrolytic cell through the electrodes. Some embodiments may include valve 219 and valve 220 which may be used to control the recirculation ratio. Soap solution and additional air is supplied to water outlet conduit 211 through line 221. At least one conveyor may be provided having downwardly depending flaps positioned to sweep at or near a surface of a fluid in the basin, and therefore sweep any solids at or near the surface towards the solid exit port.

Figure 3:
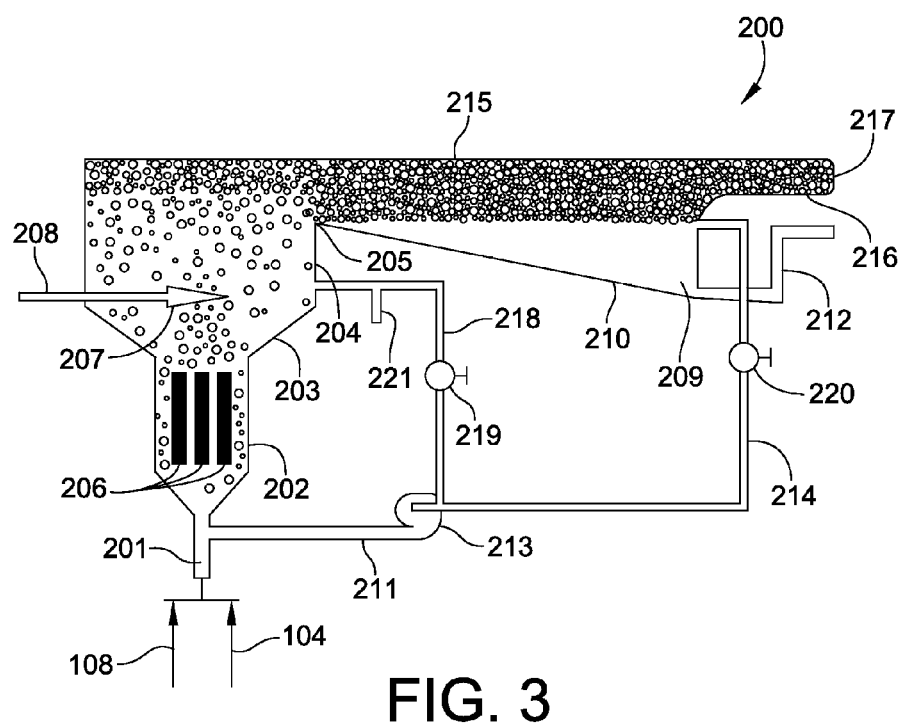
FIG. 3 shows an alternative embodiment of a system for removing naphthenic acid and naphthenic compounds from an aqueous solution according to an aspect of the present disclosure.

FIG. 3 shows system 200 for removing naphthenic acid and naphthenic compounds from an aqueous solution according to an aspect of the present disclosure. In this aspect of the present disclosure, electrolytic cell 202 may be configured and disposed to receive one or more oxidizing agents from feed conduit 104 and the aqueous solution comprising the constituent to be removed through conduit 108. Feed conduit 104 and conduit 108 may both be configured and disposed to feed inlet conduit 201, which may be connected to the bottom of an electrolytic cell 202. In this aspect, inlet conduit 201 may comprise a packing material, such as packing material 114, for increasing the mixing of the oxidizer(s) with the aqueous solution. In at least one aspect, conduits 108 and 104 are configured and disposed to feed the aqueous solution and the oxidizer(s) directly to electrolytic cell 202. In at least one additional aspect, conduits 108 and 104 are configured and disposed to feed the aqueous solution and the oxidizer(s) at different points in electrolytic cell 202.

INDUSTRIAL APPLICABILITY

Aqueous solutions generated in mining, oil, gas, and other industries or operations involving boring a hole in the earth, may comprise naphthenic acid. For example, naphthenic acids are a major contaminant in water used for extraction of oil. The discharge of naphthenic acid may be regulated or otherwise be required to be removed from effluent water. The traditional method of oxidizing the naphthenic acid in holding ponds or manmade lakes may be impractical. For example, in offshore drilling operations there may not be space available for a holding pond. The present disclosure provides a method and apparatus for removing naphthenic acid from an aqueous solution in more timely fashion and avoiding the need for a holding pond.

It will be apparent to those skilled in the art that various modifications and variations can be made to the disclosed process and system. Other embodiments will be apparent to those skilled in the art from the consideration of the specification and practice of the disclosed process and system. It is intended that the specification and examples be considered as exemplary only, with a true scope being indicated by the following claims and their equivalents.

What is claimed is:

1. A process for removing a constituent selected from the group consisting of naphthenic aldehyde, naphthenic alcohol, naphthenic acid, and combinations thereof, from an aqueous solution comprising the steps of:
   (a) feeding an aqueous solution comprising a constituent selected from the group consisting of naphthenic aldehyde, naphthenic alcohol, naphthenic acid, and combinations thereof, into a mix tank;
   (b) feeding an oxidizing agent into the mix tank forming a reactant mixture;
   (c) mixing the reactant mixture in the mix tank;
   (d) coagulating the reactant mixture with a polyvalent metallic electrode forming metallic naphthenate particles;
   (e) flocculating the metallic naphthenate particles forming floc;
   (f) sparging to float the floc to the surface of the aqueous solution; and
   (g) removing the floc from the aqueous solution.

2. The process of claim 1 wherein the step of feeding an oxidizing agent accelerates the step of coagulating the reactant mixture with a polyvalent metallic electrode forming metallic naphthenate particles.

3. The process of claim 1 wherein the polyvalent metallic electrode comprises at least one divalent or trivalent metal.

4. The process of claim 1 wherein the polyvalent metallic electrode comprises at least one of aluminum, bismuth, calcium, cerium, copper, barium, cobalt, copper, iron, lead, lithium, magnesium, manganese, nickel, potassium, sodium, vandyl, zinc, and zirconium.

5. The process of claim 1 wherein the oxidizing agent comprises at least one of peroxide, halogen, permanganate, or ozone.

6. The process of claim 1 further comprising a step of:
   (h) passing the reactant mixture in a generally vertically upward direction through an electrolytic cell having a plurality of electrodes surrounded by a moving bed of solid, non-conductive particles, wherein the electrodes are connected in series and the polarity of the electrodes is alternated continuously.

7. The process of claim 1 wherein the source of the aqueous solution comprising naphthenic acid is from a borehole drilled in the earth's crust.

8. The process of claim 1 wherein steps (a)-(g) are performed simultaneously.

9. An apparatus configured to perform the process steps of claim 1, the apparatus comprising:
   an aqueous solution feed conduit configured and disposed to continuously feed the aqueous solution comprising the constituent;
   an oxidizer feed unit configured and disposed to continuously feed one or more oxidizers;

a mix tank configured and disposed to receive and mix the fed one or more oxidizers and the fed the aqueous solution comprising the constituent;

an electrolytic cell having a top end and a bottom end and comprising a plurality of the polyvalent metallic electrodes connected in series;

an inlet conduit connected to the bottom end of the electrolytic cell configured and disposed to receive the outflow from the mix tank;

a closed upper section at the top end of the electrolytic cell, the upper section having an upper end and an outlet passage located at the upper end, and a sparger located above the electrodes and below the outlet passage, and a recirculating conduit located below the outlet passage;

a closed draining space in fluid communication with the outlet passage further comprising means for separating water and impurities; and a recirculating pump connecting the recirculating conduit to the inlet conduit.

10. The apparatus of claim 9 wherein the oxidizer feed unit comprises a docifier configured to feed the oxidizing agent drop-wise, at a desired feed rate, into the mix tank.

11. The apparatus of claim 9, wherein the means for separating water from impurities comprises an inclined bottom basin sloping away from the upper section further comprising, (i) a purified water outlet at a lower end of the inclined bottom opposite the upper section; (ii) a recirculating outlet located above the purified water outlet and connected to the recirculating pump; and (iii) an exit port located above the recirculating outlet for removing solids.

12. The apparatus of claim 9 further comprising at least one conveyor having downwardly depending flaps positioned to sweep at or near a surface of a fluid in the basin, and therefore sweep any solids at or near the surface towards the solid exit port.

13. The apparatus of claim 9, wherein the plurality of polyvalent metallic electrodes comprise at least one of iron, magnesium, aluminum, and their alloys.

* * * * *